United States Patent [19]

Anderson

[11] 4,441,024
[45] Apr. 3, 1984

[54] WIDE RANGE RADIOACTIVE GAS CONCENTRATION DETECTOR

[75] Inventor: David F. Anderson, Los Alamos, N. Mex.

[73] Assignee: The United States of America as represented by the United States Department of Energy, Washington, D.C.

[21] Appl. No.: 321,946

[22] Filed: Nov. 16, 1981

[51] Int. Cl.³ ................................................ G01T 1/18
[52] U.S. Cl. ................................................... 250/380
[58] Field of Search ................ 250/374, 375, 379, 380

[56] References Cited

U.S. PATENT DOCUMENTS 3,621,238 11/1971 Jalbert et al. ........................ 250/380
3,746,861 7/1973 Gant et al. .......................... 250/380

OTHER PUBLICATIONS

Belovodskii et al., "Ionization Chamber for Measurement of High Tritium Concentrations," translated from Pribory i Teknika Eksperimenta, No. 4, pp. 88–90, Jul.-Aug. 1971.
Anderson et al., "Management of Gaseous Wastes from Nuclear Facilities," International Atomic Energy Agency, Vienna, 1980.

Primary Examiner—Janice A. Howell
Attorney, Agent, or Firm—William W. Cochran, II; Robert W. Weig; Paul D. Gaetjens

[57] ABSTRACT

A wide range radioactive gas concentration detector and monitor which is capable of measuring radioactive gas concentrations over a range of eight orders of magnitude. The device of the present invention is designed to have an ionization chamber which is sufficiently small to give a fast response time for measuring radioactive gases but sufficiently large to provide accurate readings at low concentration levels. Closely spaced parallel plate grids provide a uniform electric field in the active region to improve the accuracy of measurements and reduce ion migration time so as to virtually eliminate errors due to ion recombination. The parallel plate grids are fabricated with a minimal surface area to reduce the effects of contamination resulting from absorption of contaminating materials on the surface of the grids. Additionally, the ionization chamber wall is spaced a sufficient distance from the active region of the ionization chamber to minimize contamination effects.

11 Claims, 3 Drawing Figures

WIDE RANGE RADIOACTIVE GAS CONCENTRATION DETECTOR

BACKGROUND OF THE INVENTION

The present invention pertains generally to measuring and testing devices and more particularly to radioactive gas detectors. This invention is the result of a contract with the Department of Energy (Contract No. W-7405-ENG-36).

There is a need for a wide dynamic range radioactive gas monitor that has the sensitivity required for routine room or stack monitoring and which also can react to unexpectedly large concentrations of radioactive gas that may result from an accident. As a stack monitor, such an instrument should have a fast response time so that the total release can be determined. It is also desirable that the instrument have reduced sensitivity to contamination such as tritium contamination.

Radioactive gas concentration detectors and monitors also have utility for measuring the concentration of tritium in the operation of heavy water moderated reactors. Additionally, with tritium fueled fusion reactors nearing reality due to increased research in this area, tritium monitoring is becoming increasingly important for human hazard prevention. Furthermore, radioactive gas monitors and concentration detectors can be used to record radioactive gas concentrations in any area where it is desirable to determine such concentrations, such as in the exhaust stacks of coal-fired factories and power plants, uranium mining operations, room monitoring within fission plants, monitoring of exhaust gases from vacuum pumps and fission plants, and stack monitoring to determine overall radioactive emissions from power plants during both normal operations and during large accidental releases. The Kanne chamber [see, e.g., J. E. Hoy, Health Physics 6, 203 (1961)] has been used for over twenty years to monitor and measure radioactive gases. The Kanne chamber is especially suitable for monitoring weak beta particle emitters since the range of these emitters in air is short when compared to the overall dimensions of the Kanne chamber. Other more energetic gaseous radioisotopes are detected with reduced efficiency since less energy is deposited in the chamber itself and more lost to the surrounding walls. A conventional embodiment of this device consists of three concentric cylinders, the inner and outer of these being held at ground potential while the intermediate cylinder is operated at approximately 200 volts. The region between the outer and intermediate cylinders serves as an ion trap. The ion trap allows the device to detect beta particle emission from gas, free from previous ionizing events, which is actually present within and passing through the space between the intermediate cylinder and inner cylinder known as the ion chamber. Decomposition of radionuclides present in the ion chamber is detected by means of a current developed between the two inner electrodes as a result of migration of charged species formed when the energy of the emitted particles is deposited in the surrounding air. Typically, 51.6 liters is used as the active volume. A large volume such as this is used since sensitivity is a function of volume in the Kanne chamber. When the Kanne device is used to detect tritium in ambient breathing air, contamination is normally not a problem. However, when exposed to high concentrations of radioactive gases such as HTO, for example, or contamination with tritiated oil, a buildup of background activity may occur which significantly reduces the sensitivity of the chamber to low tritium concentrations. Electronic compensation for large background is difficult and often unreliable. Restoration to the uncontaminated sensitivity level may require procedures ranging from simple purging of the chamber for several hours with clean air to more complex procedures of heating or disassembly and cleaning of the device, causing considerable downtime. Occasionally, a badly contaminated unit may have to be discarded.

The invention disclosed by David F. Anderson in U.S. Patent application Ser. No. 229,024, filed Jan. 27, 1981 entitled "Apparatus for Monitoring Tritium in Tritium Contaminating Environments Using a Modified Kanne Chamber," which is incorporated herein by reference for all that it teaches, discloses a device which overcomes many of the disadvantages and limitations of the Kanne chamber. The invention disclosed in the above disclosed application is useful for measuring small concentrations of radioactive gases with high precision. Additionally, it overcomes many of the problems of contamination when the device is used in a high contamination area and provides a significant improvement over the Kanne chamber device. However, the sensitivity and precision of such a device in detecting low concentrations of radioactive gases is dependent upon the ionization chamber volume. In cases where a fast response time is desired, the volume of the ionization chamber must be reduced to reduce the actual physical mixing time of the gases to be monitored. Moreover, it is desirable to produce a device which is capable of measuring not only very small concentrations of radioactive gases with high precision, but also high concentrations resulting from, e.g., accidents. Although the device of the above disclosed application is capable of measuring low concentrations of radioactive gases with high precision in contaminating environments, it is incapable of measuring extremely wide ranges of radioactive gas concentrations with a fast response time.

SUMMARY OF THE INVENTION

It is therefore an object of the present invention to provide a wide range radioactive gas concentration detector.

It is also an object of the present invention to provide a wide range radioactive gas monitor.

Another object of the present invention is to provide a wide range radioactive gas concentration detector having a fast response time and reduced sensitivity to radioactive contamination.

Another object of the present invention is to provide a wide range radioactive gas concentration detector having a fast response time, reduced sensitivity to radioactive contamination, and a dynamic range of at least $10^8$.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise a wide range radioactive gas concentration detector comprising a deionizer for removing charged particles from said radioactive gas; an ionization chamber coupled to said deionizer; a first series of parallel plate grid means spaced sufficiently close to provide a first essentially uniform electric field of sufficient intensity to essentially eliminate ion recombination effects in the detection of low concentration radioactive gases, said first series of parallel plate grid means disposed in a first active region of said ionization chamber having sufficient volume to detect said low concentration radioactive gases; a second series of parallel plate grid means spaced sufficiently close to provide a second essentially uniform electric field of sufficient intensity to essentially eliminate ion recombination effects in the detection of high concentration radioactive gases, said second series of parallel plate grid means disposed in a second active region of said ionization chamber having sufficient volume to detect said high concentration radioactive gases; means for detecting currents produced in said first and second series of parallel plate grid means in response to the migration of ions produced by said radioactive gas in said ionization chamber; whereby said detected currents are indicative of the concentration of said radioactive gas.

The present invention may also comprise, in accordance with its objects and purposes, a wide range radioactive gas concentration detector comprising a deionizer; an ionization chamber; first alternately charged parallel plate grid means disposed in said ionization chamber for detecting low concentrations of radioactive gas, said first alternately charged parallel plate means having a small contamination surface area and spaced by a distance which is substantially less than the average ion recombination distance of ions in said radioactive gas subjected to a first electric field produced by said first alternately charged parallel plate grid means such that a first measurable current is produced from the migration of ions produced in said ionization chamber by radioactivity from low concentrations of said radioactive gas; second alternately charged parallel plate grid means disposed in said ionization chamber for detecting high concentrations of radioactive gas, said second alternately charged parallel plate grid means having a small contamination surface area and spaced by a distance which is small compared to the average ion recombination distance of charged particles subjected to a second electric field produced by said second alternately charged parallel plate grid means such that a second measurable current is produced from the migration of ions produced in said ionization chamber by radioactivity from high concentrations of said radioactive gas; means for measuring said first and second measurable currents to indicate a wide range of radioactive gas concentrations.

The present invention may also comprise, in accordance with its objects and purposes, a wide range radioactive gas concentration detector having a fast response time and reduced sensitivity to radioactive contamination comprising deionizer means for removing charged particles from said radioactive gas; an ionization chamber; first alternately charged grid means disposed in a first active region of said ionization chamber for generating a first electric field sufficient to produce a first measurable current in said first alternately charged grid means resulting from the migration to said first alternately charged grid means of charged particles produced in said first active region by radioactivity from low concentrations of said radioactive gas, said first active region having a predetermined volume, said first alternately charged grid means having a small contamination surface area and spaced by a distance which is substantially less than the average recombination length of charged particles in said radioactive gas subjected to said first electric field; second alternately charged grid means disposed in a second active region of said ionization chamber for generating a second measurable current in said second alternately charged grid means from the migration of charged particles produced in said second active region by radioactivity from high concentrations of said radioactive gas, said second active region having a volume which is less than ½ of said predetermined charge collection volume of said first active region, said second alternately charged grid means having a small contamination surface area and spaced by a distance which is substantially less than the recombination length of charged particles in said radioactive gas subjected to said second electric field; means for detecting said first and second measurable currents to indicate a wide range of radioactive gas concentrations.

The present invention may also comprise, in accordance with its objects and purposes, a wide range radioactive gas concentration detector having a fast response time, reduced sensitivity to radioactive contamination and a dynamic range of at least $10^8$ comprising a deionizer; an ionization chamber; low range parallel plate grid means disposed in said ionization chamber forming a first active volume of approximately 1 liter for detecting low concentrations of radioactive gases, said low range parallel plate grid means spaced by approximately 15 mm to provide an electric field of approximately 100 V/cm; high range parallel plate grid means disposed in said ionization chamber forming a second active volume of approximately 0.1 liters for detecting high concentrations of radioactive gas, said high range parallel plate grid means spaced by approximately 7.5 mm to provide an electric field of approximately 200 V/cm.; dual range electrometer means for providing a representation of radioactive gas concentration detected by said low range and said high range parallel plate grid means.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT OF THE INVENTION

Figure 1:
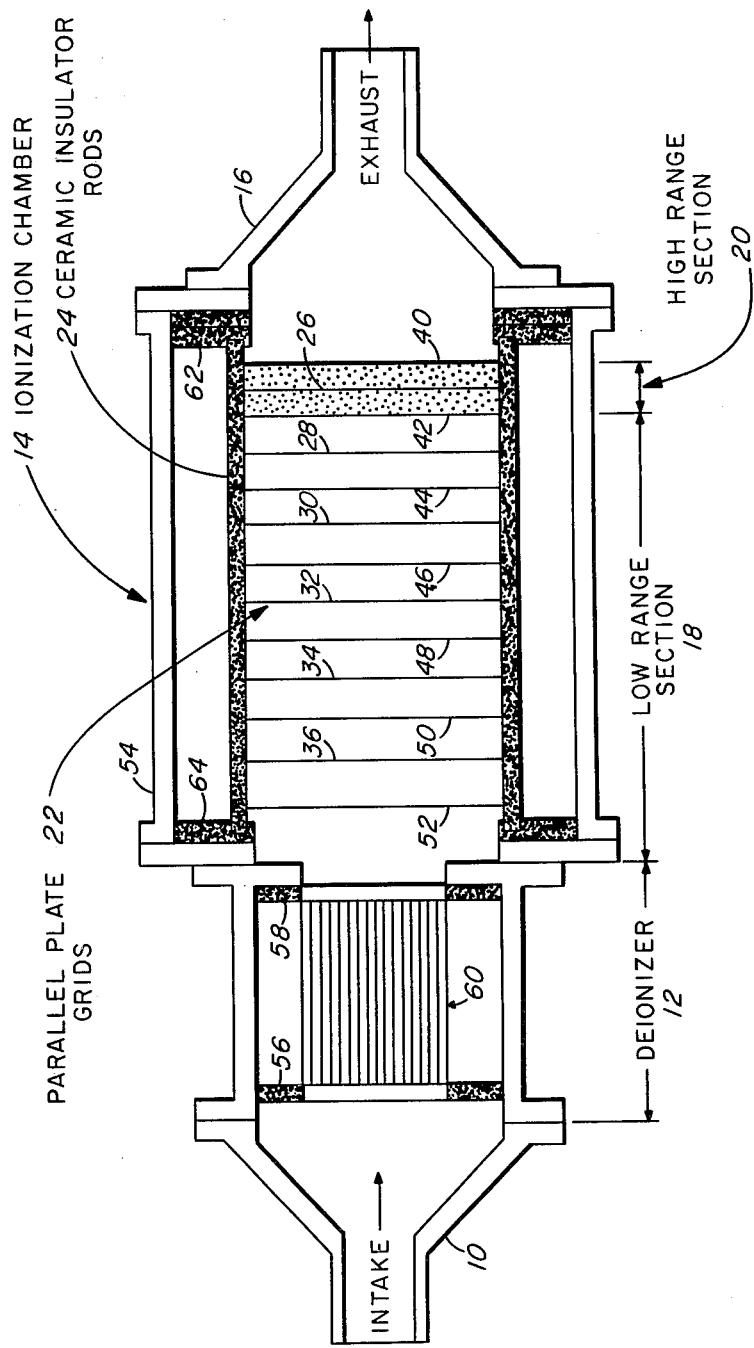
FIG. 1 is a schematic cross-sectional view of the device of the preferred embodiment of the invention.

FIG. 1 is a schematic cross sectional view of the wide range radioactive gas concentration detector of the present invention. The device illustrated in FIG. 1 comprises an intake manifold 10, a deionizer 12, an ionization chamber 14 and an exhaust manifold 16. A series of parallel plate grids 22 are disposed in ionization chamber 14. Ionization chamber 14 has two active regions, low range section 18 and high range section 20. Low range section 18 has a geometric volume of 1.0 liters with ten parallel plate grids 22 spaced by fifteen millimeters. High range section 20 has a geometric volume of 0.1 liters with three parallel plate grids spaced by 7.5 millimeters. Parallel plate grids 22 consist of stainless steel rings 9.5 cm in diameter supporting stainless steel mesh with a 0.01 mm wire width and a pitch of two lines per centimeter. Of course, parallel plate grids 22 can also comprise a wire mesh array with a similar configuration. A highly uniform electric field is generated in both low range section 18 and high range section 20 by establishing a voltage potential between adjacent parallel plate grids 22. As illustrated in FIG. 1, collector grids 26-36 are connected to ground potential while high voltage grids 40-52 are connected to a high voltage power supply. This establishes a series of alternately charged parallel plate grids in ionization chamber 14. Collector grids 26-36 are operated at ground potential while high voltage grids 40-52 are operated at +150 volts. This voltage produces an electric field of 100 volts/centimeter in the low range section 18 and an electric field of 200 volts/ centimeter in high range section 20. The close spacing of grids and high electric field produced in high range section 20 are designed to reduce ion recombination effects at high concentrations of radioactive gas. In other words, higher number densities of ions tend to increase the likelihood of ion recombination. This effect is reduced in high range section 20 by reducing the ion migration time to the collector plates by increasing the electric field to increase ion velocity and by closely spacing parallel plate grids 26, 40, and 42. The close spacing of parallel plate grids in low section 18 also accomplishes the same effects. To reduce the problem of contamination due to tritiated oil or condensation of tritium water vapor, the detector of the present invention is designed such that inner wall 54 of ionization chamber 14 is at least 10 mm from the active volume where parallel plate grids 22 are disposed. The maximum range of tritium betas in air at standard atmospheric pressure is approximately 7 mm. Even at higher elevations such as at Los Alamos, N. Mex., where the pressure is only about 70% of standard atmospheric pressure, the maximum range is only 10 mm. Therefore, with ionization chamber wall 54 at the same potential as collection grids 26-36, tritium contaminated walls will not contribute to the signal. Moreover, contribution due to contamination is further reduced by fabricating the electrodes from fine grids to reduce the surface area exposed to the radioactive gas within the active region of parallel plate grids 22. This can be accomplished by using metallic plates such as stainless steel having a plurality of perforations formed therein, a stainless steel mesh, or an array of small wires forming a grid.

Deionizer 12 is disposed between intake manifold 10 and ionization chamber 14 to remove charged particles from the sample of radioactive gas to be detected. Deionizer 12 contains a series of parallel stainless steel plates 60 spaced by 4 mm having alternate potentials of +150V and ground. The same +150V power supply used for high voltage plates 40-52 is also used for the high voltage parallel plates used in deionizer 12. Deionizer plates 60 are supported by a ceramic frame 56 and 58.

A series of six ceramic insulator rods 24 are used to support parallel plate grids 22 and ionization chamber 14. Three ceramic insulator rods are used to support high voltage grids 40-52 while three alternately disposed ceramic insulator rods are used to support collector grids 26-36. Ceramic insulator rods 24 are supported by a ceramic frame 62 and 64. It should also be noted that although the figures indicate the use of a ceramic as an insulator, it has been found that permali works as well, is less expensive, and is much easier to fabricate. Permali is a very dense plastic-impregnated wood insulator, a product of Permali, Inc.

Figure 2:
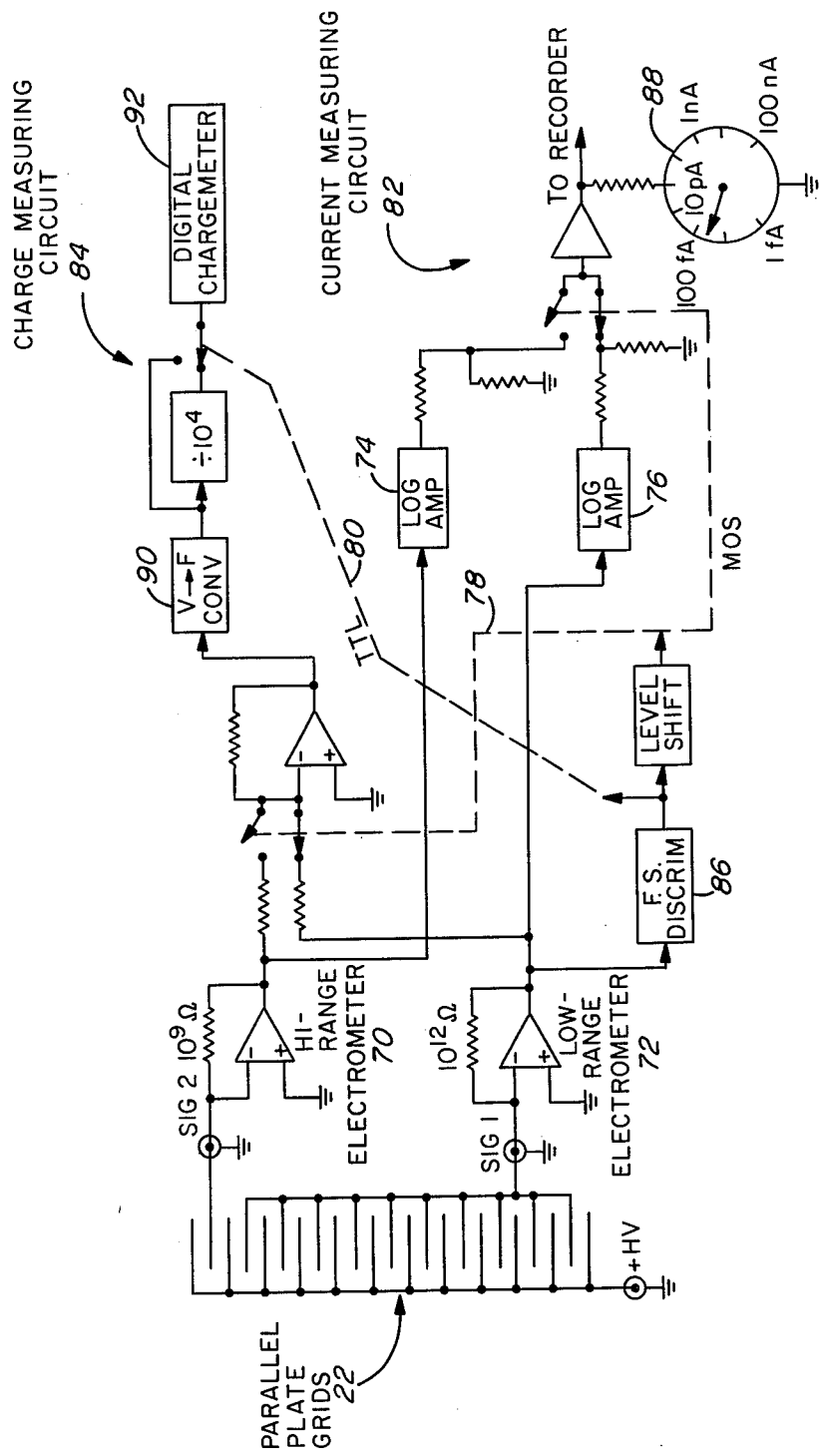
FIG. 2 is a schematic illustration of the electronics used in conjunction with the device of the preferred embodiment of the invention.

FIG. 2 is a schematic block diagram of the current and charge measuring electronics used with the wide range radioactive gas concentration detector of the present invention. Two electrometer amplifiers 70 and 72 receive current signals SIG 1 and SIG 2 from low range section 20 and high range section 22, respectively, of the detector of FIG. 1.

The low range electrometer 72 is a varactor bridge type housed in a temperature controlled enclosure to assure long term zero stability. The enclosure maintains the cavity temperature at 40°±0.5° C. for ambient temperature of 20°-35° C. The electrometer drift is $2 \times 10^{-15}$ amps (2 fA) or less after the oven and its contents stabilize for several hours. The particular electrometer utilized is a Teledyne Philbrick Model 1702 which was chosen for excellent low frequency noise characteristics, low long term drift, good resistance to input overload transients and low cost. High range electrometer 70 is a low cost FET type having a transimpedance resistor scaled appropriately for the range desired and for the small chamber volume.

High range electrometer 70 and low range electrometer 72 each feed four-decade logarithmic amplifiers 74 and 76, respectively. Logarithmic amplifier 74 has a half scale output bias. A solid-state switching arrangement, schematically illustrated as dashed line 78 and 80 connects only one input signal at a time to the current measuring circuit 82 and charge measuring ciruit 84, respectively. Crossover sensing between the two sets of circuits is done with a discriminator 86 that triggers at full scale level on low range electrometer 72. By matching the time constants of the electrometer circuits, crossover switching at low impedance levels can be done with minimal transient effect on the wide range output display. The final eight decade analog current output indication on current measuring circuit output display 88 is derived by mixing the output of logarithmic amplifier 74 and 76. The low range readings spanning 1 fA to 10 pA are fed directly to the output indicators if crossover discrimination has not been triggered. The high range reading spanning 10 pA to 100 nA are superimposed upon a half scale dc bias voltage, giving continuity of readings over the full eight decades.

Charge measurement is made with a low drift voltage to frequency converter 90 fed from the linear output of high range electrometer 70 and low range electrometer 72. The pulse train from the converter 90 is counted to provide digital signal integration which is a measure of charge. Digital charge meter 92 provides a digital display that covers ten decades from $10^{-12}$ C/digit to $10^{-2}$ C/full scale. The readout has digital indicators covering three decades and exponent multipliers. The counting scale factor is changed by $10^4$ at the transition point between high and low current ranges. Readout of charges autoranges whereby the three most significant digits with nonzero information are displayed along with the correct exponent multiplier. If more than three significant digits are desired, the entire charge meter memory contents can be read out manually using a thumb wheel switch to select the exponent multipliers.

If background levels from the ionization chamber 14 are constant, a "reverse" current of as much as 100 fA can be injected into the input of the low range electrometer. This reduces the undesired accumulation of charge from background over long interaction periods.

Remote readout of the instrument is achieved with optional peripheral devices. A strip chart recorder may be used at the current meter output, as illustrated in FIG. 2, or the analog level can be sent to a data acquisition system. The output of digital chart meter 92 consists of an analog level corresponding to the magnitude of the contents of the three decades of digital indicators, along with a three line BCD code for the associated exponent multiplier.

Several peripheral system requirements and features should be noted. The parallel electrode arrangement in the ionization chamber results in a high interelectrode capacitance. Therefore, the chamber high voltage supply must have very low noise to avoid capacitively coupled noise into the electrometer illustrated in FIG. 2. Batteries, or a highly filtered regulated power supply, should be used to avoid these problems. The capacitance of the chamber must also be stable, and the detector needs to be protected from microphonic sources to minimize mechanical noise. As is true in any sensitive electrometer system, signal cables between the detector and the electrometer must be short and rigid. The system illustrated in FIG. 2 allows the electrometer head to be close to the ionization chamber, but the control and readout chassis may be as far as 50 to 100 meters from the point of measurement.

Figure 3:
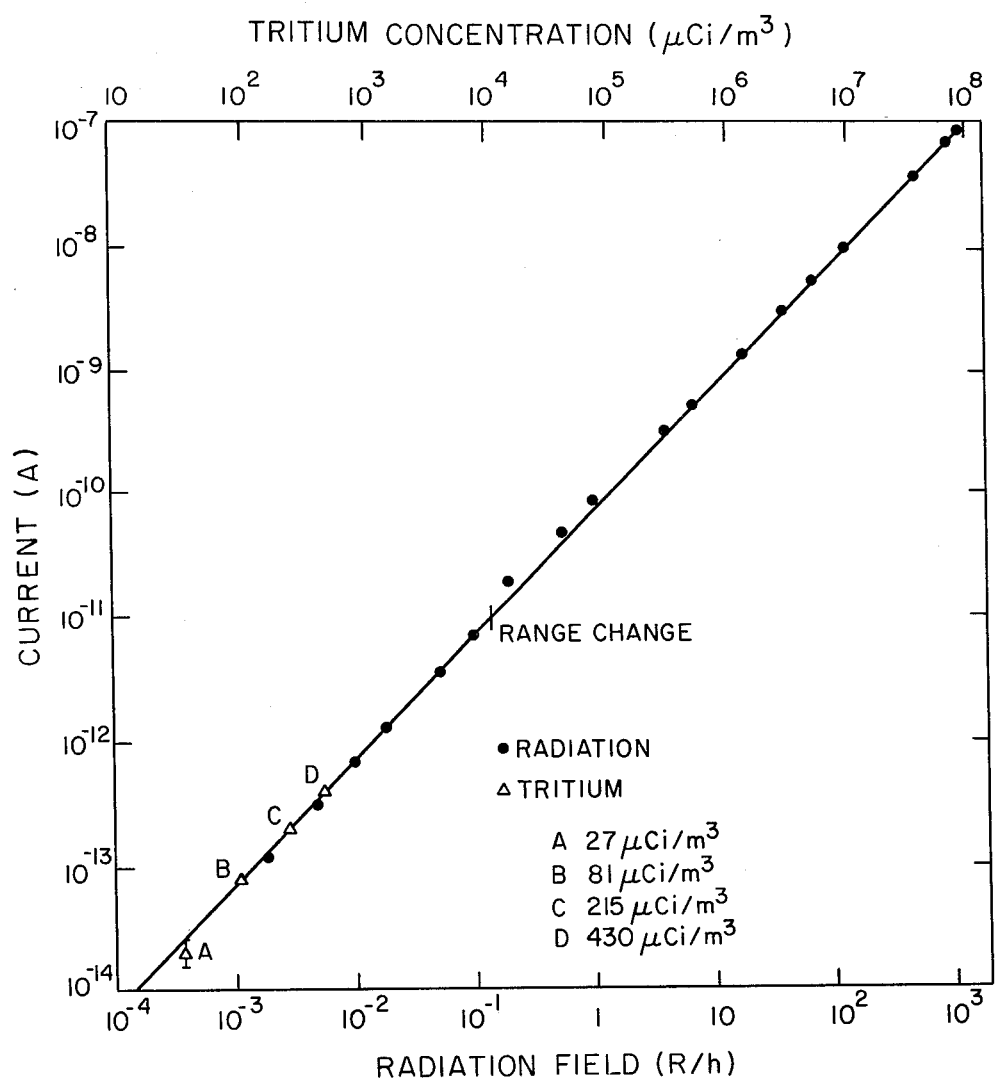
FIG. 3 is a graph of experimental test results of the preferred embodiment of the invention.

The device of the present invention was first calibrated and tested at the Los Alamos Gamma Calibration Range. Radiation fields of $1.9 \times 10^{-3}$ to $1.2 \times 10^3$ R/h were used. The output current, automatically normalized to the one liter chamber, was recorded. The results of the gamma calibration are shown in FIG. 3. At the range change marked on the figure, there was a slight deviation from a linear response. This corresponds to a reading of approximately 35% too high at the range change caused by a submillivolt offset in the zero position of the high range electronics. The results of the gamma calibration showed the monitor to be linear over almost eight decades, with the limitation in the dynamic range due to the electronics and not the ionization chamber.

The device was then calibrated with four concentrations of tritium. These concentrations were 27, 81, 215, and 430 $\mu$Ci/m$^3$ shown as points A-D on FIG. 3. Points B, C, and D fall on a straight line. The large uncertainty on the 27 $\mu$Ci/m$^3$ measurement was due to the short measurement time used, i.e., 100 seconds. The best fit of the tritium calibration was: $C = 1.08 \times 10^{15}$ i, where C is the tritium concentration in microcuries per meter$^3$ and i is the normalized current in amps. From this data it can be seen that in a low background environment and with a current integration time of a few minutes to average out signal fluctuations, tritium concentrations having a few $\mu$Ci/m$^3$ can easily be measured. A concentration of $10^8$ $\mu$Ci/m$^3$ is trivially measurable.

The time constant of the current meter is one second, to allow faithful tracking of high concentrations of tritium. This fast response time results in large fluctuations from noise and signal statistical considerations at the most sensitive end of the scale. Therefore, signal averaging from charge reading is necessary for accuracy at low radioactive gas concentrations.

The device of the present invention was found to have a long hysteresis when dropping from the high range to the low range. The response time of the high range and of the low range (without having been in the high range first) is just the time constant of the electronics. However, shortly after the monitor has shifted to the high range, the low range electrometer amplifier saturating the virtual ground operation at the input is lost, and a voltage builds up at the collector grids of the low range chamber. This voltage buildup on the insulators of the system results in dielectric absorption of charge in the materials. When the radiation is reduced and the amplifier comes out of saturation, the charge slowly comes out of the material, giving a long recovery time. The low range chamber recovers to about $2 \times 10^{-13}$ A in two minutes but takes half an hour to return to zero.

Ceramic, permali, and polystyrene have been used as insulators in an attempt to reduce this charge injection problem, with similar results for all three. One manner of solving the problem would be to physically ground the input of the low range preamp at the range change. This would prevent the voltage buildup. In a complete operating system however, electrical hysteresis such as disclosed above will not be a practical problem because the mechanical system components have hysteresis characteristics that dominate. Consequently, the present invention provides a wide range radioactive gas concentration detector which is capable of measuring radioactive concentrations of gases over a range of eight orders of magnitude. The device of the present invention is designed to have an ionization chamber which is sufficiently small to give a fast response time for measuring radioactive gases but sufficiently large to provide accurate readings. The close spacing of the parallel plate grids provides two major advantages to the device of the present invention. First, an essentially uniform electric field is established in the active region of the ionization chamber to provide accurate measurements, and, in addition, the migration time of ions to the parallel plate grids is reduced to virtually eliminate detection errors due to ion recombination. The parallel plate grids are fabricated to expose a minimal surface area so as to reduce the effects of contamination resulting from the absorption of contaminating materials on the surface of the grids. Additionally, the ionization chamber wall is spaced a sufficient distance from the active region of the ionization chamber to further minimize contamination effects.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A wide range radioactive gas concentration detector comprising:

a deionizer for removing charged particles from said radioactive gas;

an ionization chamber coupled to said deionizer;

a first series of parallel plate grid means spaced sufficiently close to provide a first essentially uniform electric field of sufficient intensity to essentially eliminate ion recombination effects in the detection of low concentration radioactive gases, said first series of parallel plate grid means disposed in a first active region of said ionization chamber having sufficient volume to detect said low concentration radioactive gases;

a second series of parallel plate grid means spaced sufficiently close to provide a second essentially uniform electric field of sufficient intensity to essentially eliminate ion recombination effects in the detection of high concentration radioactive gases, said second series of parallel plate grid means disposed in a second active region of said ionization chamber having sufficient volume to detect said high concentration radioactive gases;

means for detecting currents produced in said first and second series of parallel plate grid means in response to the migration of ions produced by said radioactive gas in said ionization chamber;

whereby said detected currents are indicative of the concentration of said radioactive gas.

2. The detector of claim 1 wherein said first and second series parallel plate grid means comprise a series of metallic plates having a plurality of perforations formed therein.

3. The detector of claim 1 wherein said first and second series of parallel plate grid means comprise a series of wire array grids.

4. The of claim 1 wherein said first and second series of parallel plate grid means are spaced by a distance than 1/100 of the ion recombination length.

5. The detector of claim 1 wherein the said ionization chamber has walls which are spaced sufficiently from said first and second series of parallel plate grid means to substantially eliminate contamination effects from said walls.

6. A wide range radioactive gas concentration detector comprising:

a deionizer;

an ionization chamber;

first alternately charged parallel plate grid means disposed in said ionization chamber for detecting low concentrations of radioactive gas, said first alternately charged parallel plate means having a small contamination surface area and spaced by a distance which is substantially less than the average ion recombination distance of ions in said radioactive gas subjected to a first electric field produced by said first alternately charged parallel plate grid means such that a first measurable current is produced from the migration of ions produced in said ionization chamber by radioactivity from low concentrations of said radioactive gas;

second alternately charged parallel plate grid means disposed in said ionization chamber for detecting high concentrations of radioactive gas, said second alternately charged parallel plate grid means having a small contamination surface area and spaced by a distance which is small compared to the average ion recombination distance of charged particles subjected to a second electric field produced by said second alternately charged parallel plate grid means such that a second measurable current is produced from the migration of ions produced in said ionization chamber by radioactivity from high concentrations of said radioactive gas;

means for measuring said first and second measurable currents to indicate a wide range of radioactive gas concentrations.

7. The detector of claim 6 wherein said first and second alternately charged parallel plate grid means comprise metallic plates having a plurality of perforations formed therein.

8. The detector of claim 6 wherein said first and second alternately charged parallel plate grid means comprise a plurality of wire array grids.

9. A wide range radioactive gas concentration detector having a fast response time and reduced sensitivity to radioactive contamination comprising:

deionizer means for removing charged particles from said radioactive gas;

an ionization chamber;

first alternately charged grid means disposed in a first active region of said ionization chamber for generating a first electric field sufficient to produce a first measurable current in said first alternately charged grid means resulting from the migration to said first alternately charged grid means of charged particles produced in said first active region by radioactivity from low concentrations of said radioactive gas, said first active region having a predetermined volume, said first alternately charged grid means having a small contamination surface area and spaced by a distance which is substantially less than the average recombination length of charged particles in said radioactive gas subjected to said first electric field;

second alternately charged grid means disposed in a second active region of said ionization chamber for generating a second measurable current in said second alternately charged grid means from the migration of charged particles produced in said second active region by radioactivity from high concentrations of said radioactive gas, said second active region having a volume which is less than 178 of said predetermined charge collection volume of said first active region, said second alternately charged grid means having a small contamination surface area and spaced by a distance which is substantially less than the recombination length of charged particles in said radioactive gas subjected to said second electric field;

means for detecting said first and second measurable currents to indicate a wide range of radioactive gas concentrations.

10. A wide range radioactive gas concentration detector having a fast response time, reduced sensitivity to radioactive contamination and a dynamic range of at least $10^8$ comprising:

a deionizer;

an ionization chamber;

low range parallel plate grid means disposed in said ionization chamber forming a first active volume of approximately 1 liter for detecting low concentrations of radioactive gases, said low range parallel plate grid means spaced by approximately 15 mm to provide an electric field of approximately 100 V/cm;

high range parallel plate grid means disposed in said ionization chamber forming a second active volume of approximately 0.1 liters for detecting high concentrations of radioactive gas, said high range parallel plate grid means spaced by approximately 7.5 mm to provide an electric field of approximately 200 V/cm.;

dual range electrometer means for providing a representation of radioaotive gas concentration detected by said low range and said high range parallel plate grid means.

11. The device of claim 10 wherein said parallel plate grid means are formed from sheets of stainless steel mesh with a wire width of approximately 0.01 mm and a pitch of approximately 2 lines/cm.

* * * * *